Figure 1:
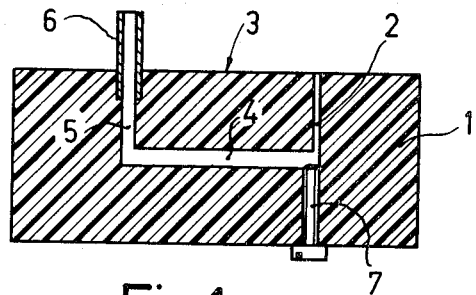

United States Patent [19]

Severin et al.

[11] 3,794,912
[45] Feb. 26, 1974

[54] CONTACT DEVICE USING CONDUCTIVE FLUID FOR MEASURING RESISTANCE AND CAPACITANCE OF SEMICONDUCTOR

[75] Inventors: Petrus Johannes Wilhelmus Severin; Gerardus Johannes Maria Poodt; Gerard Vermeulen, all of Emmasingel, Eindhoven, Netherlands

[73] Assignee: U.S. Philips Corporation, New York, N.Y.

[22] Filed: May 15, 1972

[21] Appl. No.: 253,306

[30] Foreign Application Priority Data
May 19, 1971  Netherlands................. 7106853

[52] U.S. Cl.............. 324/62, 324/60 C, 324/158 P, 324/158 D, 339/118 R
[51] Int. Cl.................................................. G01r 27/02
[58] Field of Search...... 324/60 C, 60 R, 62, 158 P, 324/158 F, 158 D, 92; 339/118 R

[56] References Cited
UNITED STATES PATENTS

| | | | |
|---|---|---|---|
| 1,897,330 | 2/1933 | Pender........................... | 324/62 R |
| 2,740,099 | 3/1956 | Schultz.......................... | 339/118 R |
| 3,315,156 | 4/1967 | Keller............................ | 324/62 R X |
| 3,452,275 | 6/1969 | Haines et al................. | 324/61 R X |
| 3,649,488 | 3/1972 | Pitetti et al.................. | 324/60 R X |

FOREIGN PATENTS OR APPLICATIONS
1,022,463  3/1966  Great Britain.................. 324/158 D OTHER PUBLICATIONS
Kleemann et al., IBM Technical Disclosure Bulletin, Tester For Semiconductor Devices, Nov. 1964, pp. 444 and 445.
Theodoseau et al., IBM Technical Disclosure Bulletin, Wetted Contact, Nov. 1967, pp. 695 and 696.

Primary Examiner—Stanley T. Krawczewicz
Attorney, Agent, or Firm—Frank R. Trifari

[57] ABSTRACT
A contact device comprising an insulating block having a flat upper surface which forms a place for receiving a semiconductor body, in which block at least one duct is present which opens into the upper surface and forms a contact place there, the block comprising a storage container for an electrically conductive liquid, for example mercury, communicating with the duct, said liquid being forced to the contact place by means of a gas under pressure in the duct, an electric conductor being passed through the block of which one end is connected to the liquid and the other end can be connected to a measuring instrument. The contact device may advantageously be used in carrying out a capacity-voltage measurement or a spreading resistance measurement in semiconductor materials.

8 Claims, 8 Drawing Figures

CONTACT DEVICE USING CONDUCTIVE FLUID FOR MEASURING RESISTANCE AND CAPACITANCE OF SEMICONDUCTOR

The invention relates to a contact device for use with an instrument for the electric measurement of physical properties of a body, in particular a semiconductor body. The invention relates moreover to a method of determining a physical quantity of a semiconductor body.

In such a device which may be used inter alia in measuring the resistivity, the sheet conductance, the spreading resistance or the capacitance, metal pins are generally used which are pressed against the semiconductor body. For capacitance measurement, defined contact places are moreover provided, for example, by vapour deposition of metal. When using pins made, for example, from tungsten carbide or steel, damage occurs to the semiconductor body. Furthermore the contact characteristics between the pin and the semiconductor body are not known accurately, on the one hand as a result of the detrition of the pin and on the other hand by a certain extent of roughness which the surface of the semiconductor body always has. In a capacity-voltage measurement there is the additional drawback that providing the metal contacts by vapour deposition is time-consuming.

For measuring the resistivity or the sheet conductance a four-point measurement, is known in which a contact device is used which consists of four supported capillary tubes which are filled with mercury, convex meniscuses of mercury project from the tubes. Copper wires in contact with the mercury lead to a measuring instrument. Despite the use of mercury, damage to the semiconductor body may occur in this contact device since the capillary tubes must to be forced rigidly against the semiconductor body. This device has the further drawbacks that the contact surface is not clearly determined, the mercury meniscus is rapidly polluted and no contact at all is made when some loss of mercury occurs.

It is the object of the invention to provide a contact device for use with an instrument for the electric measurement of physical properties of a semiconductor body, in which damage to the surface of the semiconductor body is prevented with certainty, in which the contact surface is accurately determined, and in which the operation is extremely simple. In order to achieve this object, the device according to the invention comprises an insulating block having a flat upper surface which constitutes a place for receiving the body, said block comprising at least one duct which debouches into the upper surface and the orifice of which constitutes a contact place, the block comprising a storage container for an electrically conductive liquid, for example, mercury, communicating with the duct, said storage container having a connection for a gas under pressure for forcing the liquid from the storage container through the duct to the contact place, an electric conductor being passed through the block, one end of said conductor being connected to the liquid and the other end being connectable to the measuring instrument.

The semiconductor body which is, for example, in the form of a flat disc, can be placed on the upper surface of the block which consists, for example, of a synthetic material in which no damage to the disc can occur. The semiconductor body may be pressed on the rear side where in general no diffusion is carried out. If desirable a further electric contact may be made there by means of a metal pin. Any small damage to said rear side is unimportant for the good operation of the semiconductor device. The contact place which the liquid, for example mercury, forms with the semiconductor body has a very accurately defined surface area, namely exactly the cross-section of the orifice of the duct at the upper surface. The mercury can be forced into the duct in a simple manner by means of, for example, air under pressure and make contact with the semiconductor disc. After the mercury has flowed back to the container, pollution of the mercury need not be feared. The contact device can be operated extremely simply and is rapid in operation.

In an embodiment which is particularly suitable for capacity-voltage measurement or for measuring the spreading resistance of a semiconductor body, the device comprises at least one contact pin which is secured to an arm and which can be moved in the direction of the upper surface of the block by means of a spring under a pressure to be adjusted previously, and which comprises a connection conductor. The contact pin can be moved to or from the measuring position in a simple manner by means of a cam which influences the arm.

In a further embodiment which is particularly suitable from measuring the resistivity of semiconductor material by means of a four-point measurement or for spreading resistance measurement, several ducts are in the block the contact places having opening into the upper surface at accurately defined positions. Each duct communicates with a separate storage container and each storage container has a connection which can be made to communicate with a source of gas under pressure. An electric conductor leads from each of the ducts or containers and is connectable to a measuring instrument. In this manner an extremely accurately operating and structurally very simple contact device is obtained.

In a further, structurally slightly different embodiment, several ducts are again in the block with contact places opening into the upper surface at accurately defined positions, the ducts however communicate with one single storage container extending in the transverse direction of the ducts the capacity of which is larger than the collective requirements of the ducts. The conductive liquid of the storage container may be brought into or out of contact with the ducts by tilting the block, said storage container having a connection which alternately may be connected to source of a gas under pressure. An electric conductor leads from each of the ducts and is connectable to a measuring instrument.

In these devices, the upper surface of the block can advantageously be formed by a thin plate, the ends of the ducts consisting of apertures in the plate and forming the contact places. The contact places can easily be defined extremely accurately relative to each other and substantially any desirable cross-section for the contact places can be realized.

A contact device according to the invention can advantageously be used to determine a physical quantity of a semiconductor layer, for example, gallium arsenide or silicon, particular layers constituting the starting semiconductor body during the manufacture of a semiconductor device. For example, an integrated circuit uses a semiconductor body comprising a semiconductor substrate and a semiconductor epitaxial layer provided on the substrate. Circuit elements are provided by conventional operations, such as for example by diffusion of impurities.

In this case it is important, to obtain a semiconductor device having the desirable electrical properties. One or several properties of the epitaxial layer, for example the thickness and/or the impurity concentration, must lie within previously determined limits which depend upon the requirements imposed upon the semiconductor device to be manufactured.

According to a known non-destructive method of determining one or several characteristics of an epitaxial layer provided on a substrate, a separate experimental body is measured on which an epitaxial layer is grown under the same circumstances used for the manufacturing run, as a measure of the epitaxial layer provided on the substrates in the manufacturing run.

By using a contact device according to the invention, however, it is possible to perform an accurate and non-destructive measurement on the epitaxial layer itself provided on the substrate prior to subjecting the semiconductor body to conventional operations, for example, the provision of diffused zones.

According to the invention, a method of determining a physical quantity of a semiconductor layer is characterized in that an already described contact device is used comprising at least a contact pin which is movable in the direction of the block. The mercury is made to contact the layer as a result of which a rectifying junction is formed. The capacity of this junction is a measure of the characteristic to be determined. The oppositely located surface of the layer is brought in electric contact with the contact pin in order to measure the capacity of the rectifying junction by measuring the capacity between the mercury and the contact pin.

By using said method it is possible in a simple and rapid manner to accurately determine properties, for example, the impurity concentration and/or the thickness of, for example, an epitaxial layer, as will be described in detail hereinafter. The method may also be used advantageously to obtain a measurement associated with one or several physical characteristics of the epitaxial layer, for example the capacity, which during the manufacture of a great number of semiconductor bodies can be compared with a previously adjusted standard, which may save cost particularly when manufacturing large numbers of semiconductor devices.

The method can be used advantageously to determine a physical property of a layer of gallium arsenide.

The invention may furthermore be used advantageously to determine a property of an epitaxial layer of one conductivity type which is provided on a substrate of the opposite conductive type, the contact pin being contacted with the substrate.

A preferred embodiment of a method according to the invention, however, is used where the semiconductor layer is constituted by an epitaxial layer of one conductivity type which is provided on a substrate of the same conductivity type.

In particular when the substrate is low ohmic, the impedance beween the mercury and the contact pin is in this case determined mainly by the capacity across the rectifying junction as a result of which accurate measurements can be carried out in very simple manner.

In a practical embodiment of the method according to the invention a voltage in the reverse direction is applied across the rectifier junction, as a result of which a depletion layer is formed in the epitaxial layer the depth of which is determined by the voltage and the impurity concentration in the epitaxial layer.

Said depletion layer may be considered as the dielectric of a capacitor of which one plate is constituted by the mercury contact and the other plate by the part of the semiconductor body which surrounds the depletion layer and of which the capacity is determined by the depth of the depletion layer and by the area of the mercury contact.

By means of the relationship between the capacity, the voltage across the rectifying junction, the impurity concentration and the distance between the edge of the depletion layer and the surface of the layer, information may then be obtained on, for example, the impurity concentration in accordance with the distance to the surface, or on the thickness of the epitaxial layer.

The method may particularly be used advantageously to determine the thickness of very thin epitaxial layers, that is to say layers the thicknesses of which are at most a few microns.

The reverse voltage across the rectifying junction may be increased until the breakdown voltage is reached which is determined mainly by the impurity concentration in the epitaxial layer.

When the semiconductor body or the epitaxial layer consists of n-type silicon, a Schottky-like rectifying junction may be obtained by providing an oxide layer of a few tens of an A thickness on the surface of the semiconductor body or the epitaxial layer prior to performing the measurement, for example by means of boiling nitric acid prior to performing the measurement.

However, a contact device according to the invention may also be used advantageously to determine the resistivity or another property associated therewith of a semiconductor layer of n-type silicon. The semiconductor layer, prior to performing the measurement is subjected to an oxidation treatment to produce a thin oxide layer on the surface of the layer, which oxide layer is then removed by an etching treatment. The layer is then brought in electric contact with three electrodes of which at least one, constituted by mercury, is contacted with the layer at the area of said surface. A current flowing between the mercury and one of the further electrodes and a voltage between the mercury and the remaining electrode are measured to find the resistivity or a quantity associated therewith.

Due to the oxidation treatment and etching treatment, respectively, the contact between the mercury and the semiconductor material is sufficiently low-ohmic for such a measurement, for example a spreading resistance measurement.

The measurement can be carried out in the usual manner, preferably by means of said two further electrodes, in which a current is conveyed through the contact and the layer by means of one of the said electrodes and the potential difference produced by said current between the mercury and the layer is determined by means of the other electrode.

If the semiconductor body consists, for example, entirely of n-type silicon, a contact device according to the invention may be used which comprises only one duct and is provided with two contact pins which are pressed against the rear side of the semiconductor body and constitute the said further electrodes. In the case, however, in which the layer is formed by, for example, an n-type epitaxial layer which is provided on the p-type substrate, a contact device may advantageously be used which comprises at least two further ducts, the mercury present in said further ducts constituting said further electrodes which can be made to contact the surface of the epitaxial layer electrically.

Figure 2:
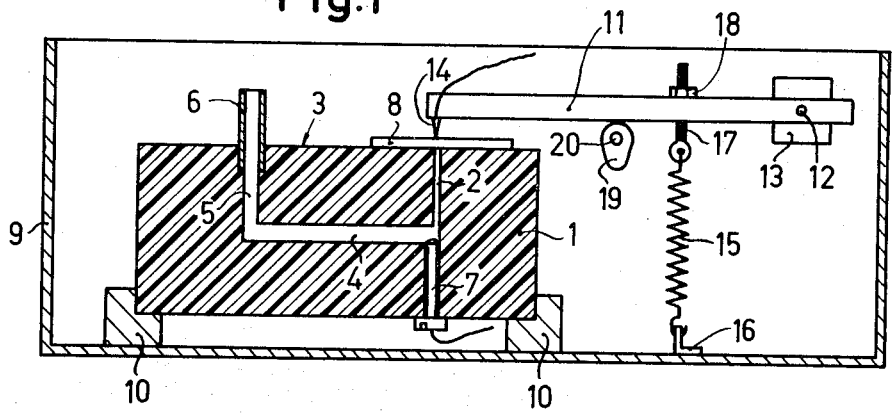
Figure 3:
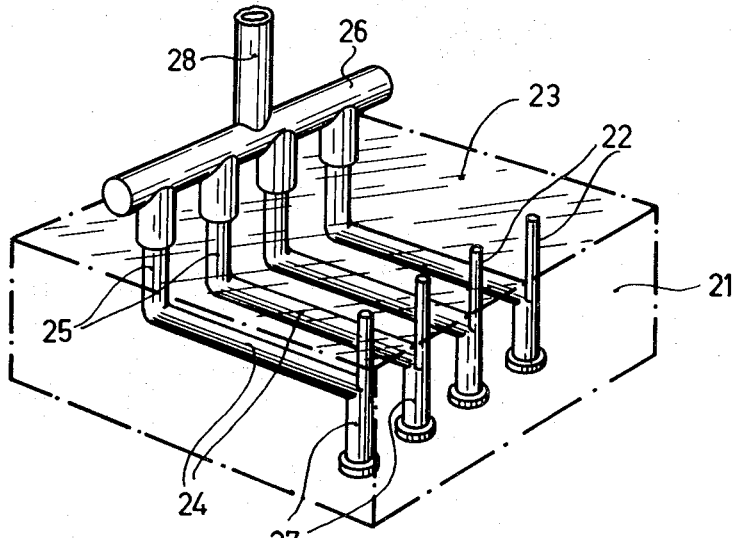
Figure 4:
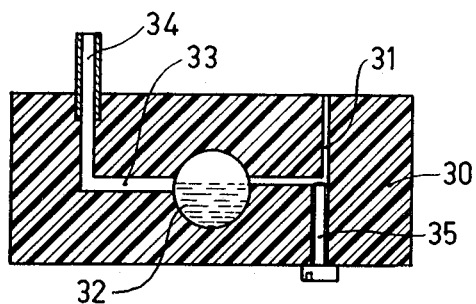
Figure 5:
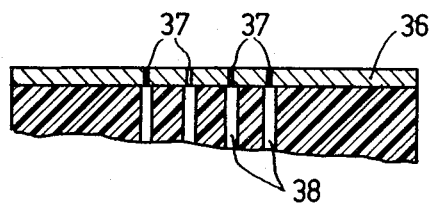
Figure 6:
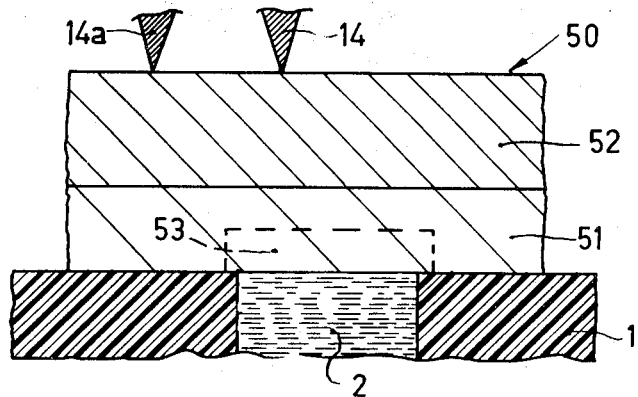

The invention will be described in greater detail with reference to the embodiment shown in the drawing. In the drawing:

FIG. 1 shows diagrammatically the contact device,

FIG. 2 shows an embodiment for, for example, capacity-voltage measurement or for measuring a spreading resistance, FIG. 3 shows an embodiment which is suitable for four-point measurement, FIG. 4 shows a further embodiment for four-point measurement, FIG. 5 shows a contact device for four-point measurement in which the contact places are formed in a thin plate, FIG. 6 shows on an enlarged scale a part of the contact device shown in FIG. 2 while measuring a physical quantity.

Figure 7:
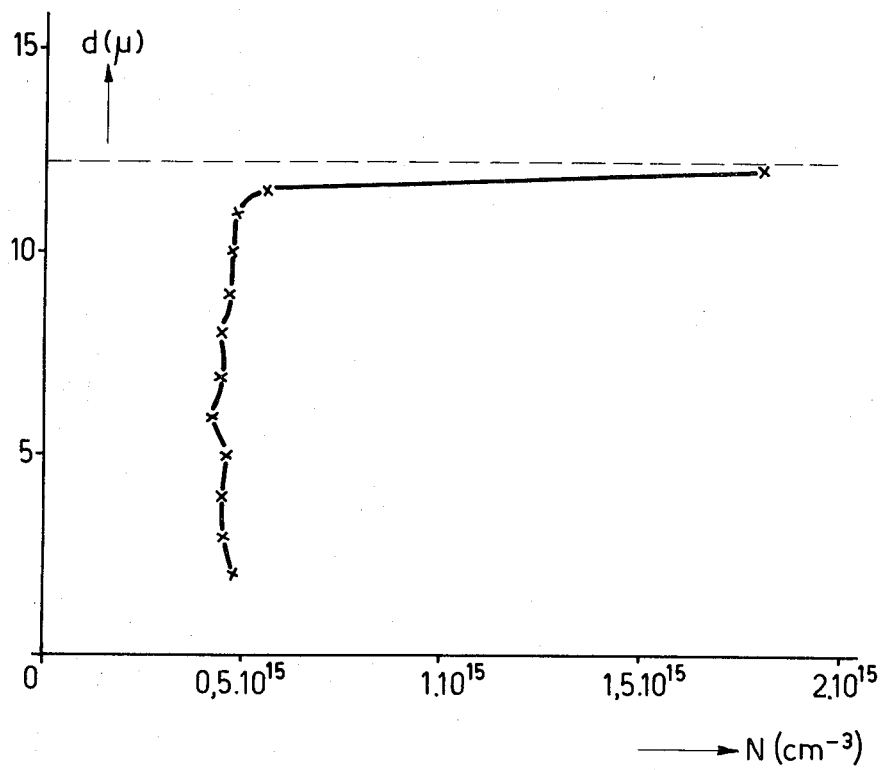
Figure 8:
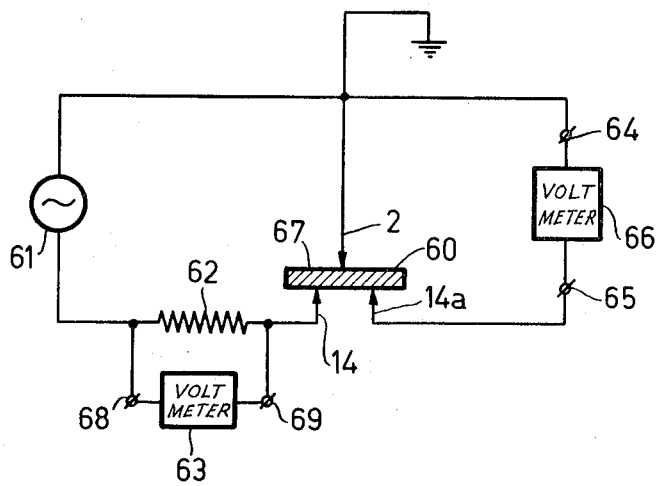

FIG. 7 is a graphical representation of the impurity concentration as a function of the epitaxial layer measured with the use of the contact device, and FIG. 8 shows diagrammatically a further embodiment of a contact device according to the invention.

The contact device shown diagrammatically in FIG. 1 consists in principle of a block 1 of an insulating material, for example a synthetic material, in which there are apertures. The block 1 has a duct 2 one end of which opens into the upper surface 3 and the other end communicates with a storate container 4 for an electrically conductive liquid, for example mercury. Communicating with the storage container 4 is a duct 5 having a connection 6 which can be connected to a source of gas, for example air, which may be supplied under pressure. The block has a bolt 7 which contacts the conductive liquid and which constitutes an electric connection to the exterior.

If gas under pressure is supplied to the connection 6 the liquid present in the container 4 is forced in the direction of the duct 2. The liquid will contact a body placed on the upper surface 3, for example, a semiconductor disc, and makes an electric contact with the semiconductor disc. This contact is non-destructive. The size of the contact area, which may often be very important for measurements, is accurately determined by the emanating cross-section of the duct 2. The block 1 may be formed integrally in which, for example, the container 4 is formed by drilling from one side, the resulting container being sealed again at said side. Alternatively, the block may be constructed from two or more parts in which the bores are easily provided and which then can be connected together, for example by means of a glue. The bores in the block may also extend differently from what is shown. It is not necessary for the duct 5 to open into the upper surface 3.

FIG. 2 shows an embodiment of a contact device particularly suitable for use in capacity-voltage measurements or in measuring the spreading resistance of a semiconductor body. On the upper surface 3 of block 1 which is constructed as is shown in FIG. 1, a disc 8 of a semiconductor material is placed. In this embodiment the block 1 is placed in a metal box-like holder 9 and bears on supports 10 secured to the bottom of the holder. An arm 11 is pivotably journalled about a shaft 12; the shaft 12 is incorporated in bearing blocks 13 secured in the side walls of the holder. The arm 11 comprises a measuring pin 14 to which an electrically conductive wire is connected. The measuring pin 14 is drawn in the direction of the semiconductor disc by means of a spring 15 which is secured on its lower side to a support 16 and is secured on its upper side to an eyelet of a screw-threaded pin 17. This pin 17 is passed through an aperture in the arm 11. By means of a nut 18, the value of the resilience can be adjusted. A cam 19 which is rotatable by means of a shaft 20 journalled in the side walls of the holder 9 can move the arm 11 into and out of the measuring position. An electrically conductive wire is also connected to the bolt 7 and, like the wire of the measuring pin 14, leads to a measuring instrument. It is also possible to provide several measuring pins on the arm 11.

FIG. 3 shows an embodiment of a contact device which is suitable in determining the resistivity of a semiconductor body by means of a four-point measurement or for spreading resistance measurement. The block 21 has four ducts 22 with ends opening into the upper surface 23 at accurately determined positions with respect to each other as is desirable in four-point measurements. The ducts 22 each communicate with a storage container 24 which communicates with ducts 25 that communicate with a connection member 26. This connection member has a tap 28 for the supply of a gas under pressure. The bolts 27 constitute the electric connection point for the measuring instrument. When a gas under pressure is supplied to the tap 28 of the connection member 26, electrically conductive liquid will simultaneously be forced from the storage containers 24 into the four ducts 22 until the liquid contacts a semiconductor body which is placed on the upper surface 23. No damage whatsoever occurs upon contacting, while the measurement can be carried out rapidly and in a simple manner. Only three contacts are necessary for the determination of a spreading resistance, so that in that case a device comprising three ducts 22 would be sufficient.

FIG. 4 is a cross-sectional view of a contact device for similar purposes as the device shown in FIG.3 but having a structurally slightly different construction. As in the construction shown in FIG. 3, a number of ducts 31 are again provided in the block 30, this time however, communicating with one single storage container 32. The storage container is, for example, cylindrical, the centre line of the cylinder extending parallel to a line through the ducts 31, so in FIG. 4 normal to the plane of the drawing. From the storage container 32, a duct 33 extends to a connection 34 for a source of gas under pressure. Like in FIG. 3, electrically conductive bolts 35 are included to serve as connection conductors.

The storage container 32 has a capacity which is larger than the collective volume of the ducts 31 and is partially filled with mercury, for example. After placing a semiconductor disc on the upper surface of the block 30 above the orifices of the ducts 31 and securing it there temporarily by means not shown, the block 30 is turned a quarter turn clockwise. The ducts 31 then become located below the level of the container 32 so that mercury flows into the ducts. Gas under pressure is then supplied to the connection 34 so that the gas fills the ducts 31 with mercury which contacts the semiconductor disc. The block is then again placed in the position shown in FIG. 4 while maintaining the gas supply pressure. The mercury still present in the storage container 32 again assumes the position shown, the level then being below the inlet apertures of the ducts 31, so that, the mercury columns in the ducts 31 are electrically separated from each other. Upon connecting the contact bolts 35 to the measuring device, the measurement can be carried out.

FIG. 5 shows how the mutual orientation of the contact places in the ducts can be obtained in an unambiguous and very simple manner. In this case the upper side of the block is formed by a thin plate 36 in which ducts 37 are drilled. In this case it is not necessary for duct 38 to be provided accurately and they may have a comparatively large diameter, which is simple for the manufacture. The shape of the ducts 37 need not be cylindrical, they may be, for example conical.

A method of determining a physical property of a semiconductor body 50 by means of a contact device according to the invention will now be described with reference to FIGS. 6 and 7.

In this embodiment the semiconductor body 50 is constituted by a substrate 52 and an epitaxial layer 51, the impurity concentration of which is desired in accordance with the distance to the surface by using the method according to the invention. In this case a contact device already described with reference to FIG. 2 is used. The mercury is contacted with the epitaxial layer 51, as a result of which a Schottky-like rectifying junction is formed, the capacity of which is a measure of the property to be measured.

The depletion layer 53 of the junction extending in the epitaxial layer 51 is denoted in FIG.6 by broken lines.

The substrate 52 is contacted with the contact pin 14 after which, by measuring the capacity between the contact pin 14 and the mercury, the capacity across the rectifying junction is determined from which the desired property of the epitaxial layer may be determined.

The substrate 52 and the epitaxial layer 51 are of the same conductivity type in the present example, as a result of which the capacity between the contact pin 14 and the mercury is substantially equal to the capacity across the rectifying junction.

The method is carried out after having subjected the semiconductor body to a standard etching treatment and oxidation treatment, as a result of which an oxide layer of a few tens of an Angstrom is formed on the surface of the epitaxial layer, which has been found to enable the formation of a Schottyky-like junction between the mercury and the n-type silicon. The oxide layer which is not shown in FIG. 6 is so thin that the capacity caused by it may be neglected relative to the capacity of the rectifying junction.

In the present embodiment, a semiconductor body 50 is used having an n-type substrate 52 the thickness of which is approximately 250 microns and the resistivity of which is approximately 0.01 Ohm.cm, and a high-ohmic n-type epitaxial layer 51 the thickness of which is approximately 5 microns and the resistivity of which is approximately 5 Ohm.cm.

It is to be noted that the resistivity of the substrate 52 is so low that the resistance through the substrate may be neglected.

The mercury electrode 2 and the contact pin 14 are connected to a voltage source by means of which the depth of the depletion layer 53 can be varied throughout the thickness of the epitaxial layer 51. At the same time, the capacity across the junction may be determined by means of an alternating voltage having a frequency of, for example, 1 MHz.

FIG. 7 shows graphically the resulting impurity concentration as a function of the distance $d$ to the surface. Moreover, the thickness of the layer can be determined rather accurately from the still sharp junction between the concentration in the layer and that in the substrate.

An embodiment of a method to determine the resistivity of a semiconductor layer 60 of n-type silicon will now be described with reference to FIG. 8.

In this case the same contact device is used as in the preceding embodiment and therefore said device is shown only diagrammatically by the arrows 2, 14 and 14a which represents a mercury electrode 2 and two contact pins 14 and 14a, respectively.

Prior to performing the measurement the semiconductor layer 60 is subjected to an oxidation treatment as a result of which the oxide layer is formed on the surface 67 of the semiconductor layer and is then removed again by an etching treatment.

The layer is then brought in electric contact with three electrodes (2, 14 and 14a), of which at least one consists of mercury (2) which is contacted with the layer 60 at the area of the surface 67.

A known current is supplied between the mercury and one of the further electrodes (14) and the voltage associated with said current is determined between the mercury (2) and the remaining electrode 14a.

The resistivity or a quantity associated therewith is then determined from the results.

In the present example, the semiconductor layer 60 is immersed in a warm solution of nitric acid or hydrogen peroxide as a result of which a thin layer of a semiconductor material is converted into a layer of silicon oxide which is then removed by etching.

Preferably within a few minutes after the said etching treatment, the mercury is contacted with the surface 67 of the layer 60 treated in the above-described manner, the contact between the mercury and the layer 60 being sufficiently low-ohmic to be able to perform such a resistance measurement.

The layer 60 is moreover contacted on its oppositely located surface with the metal contact pins 14 and 14a.

A current source 61 is connected between the mercury 2 and contact pin 14 as a result of which a current can be conveyed through the layer 60. The value of said current can be determined by means of a known resistor 62 incorporated in the current circuit by determining the voltage across the resistor 62 via the terminals 68 and 69 by means of a device 63 for determining voltages.

In the present embodiment, the terminals 68 and 69 are connected to the Y input of an XY oscilloscope in which, if desirable, differential amplifiers may be used.

The voltage difference produced by the current across the layer 60 is determined at the terminals 64 and 65 by connecting said terminals to the X input of the XY oscilloscope.

What is claimed is:

1. A device for making temporary non-destructive electrical contact with a semiconductor body, comprising an insulating block having an upper surface for receiving said body, said block having at least one duct opening into said upper surface, said opening forming a contact place, said block further comprising a storage container for an electrically conductive liquid communicating with said duct, means for forcing liquid from said storage container through said duct to said contact place, and an externally available electrical conductor leading into said block for making electrical contact with liquid in said duct, whereby said externally available electrical conductor is in electrical contact with a body resting on said upper surface when electrically conductive liquid is forced through said duct and into contact with said body.

2. A device as defined in claim 1 wherein said means for forcing liquid comprises a gas inlet in communication with said storage container for admitting gas under pressure to force liquid through said duct.

3. A device as defined in claim 2 for making more than one temporary non-destructive electrical contact with a semiconductor body, wherein said block has more than one duct opening into said upper surface at predetermined spaced locations, a separate storage container for electrically conductive liquid communicating with each of said more than one duct, a separate externally available electrical conductor leading into each of said more than one duct, and a gas inlet communicating with the storage containers for admitting gas under pressure to force liquid through said more than one duct.

4. A device as defined in claim 2 for making more than one temporary non-destructive electrical contact with a semiconductor body, wherein said block has more than one duct opening into said upper surface at predetermined spaced locations, a separate externally available electrical conductor leading into each of said more than one duct, each of said more than one duct separately communicating with said storage container at locations where liquid will enter said more than one duct upon tilting of said block and not otherwise.

5. A device as defined in claim 2 for making an electrical measurement and further comprising means for electrically contacting the surface of said body remote from said block.

6. A device as defined in claim 5 wherein said means for electrically contacting comprises:
an arm pivotably mounted to swing toward said upper surface of said block;
a spring attached between said arm and a support for urging said arm toward said upper surface;
a contact pin mounted at the end of said arm for making electrical contact with a body resting on said upper surface; and
terminal means electrically connected with said pin.

7. A device as defined in claim 6 further comprising a cam for moving said arm away from said upper surface.

8. A device as defined in claim 7 wherein the urging force of said spring is adjustable.

* * * * *